United States Patent
Ribarov et al.

(10) Patent No.: US 10,180,106 B2
(45) Date of Patent: Jan. 15, 2019

(54) SOLENOIDS FOR GAS TURBINE ENGINE BLEED VALVES

(71) Applicant: Hamilton Sundstrand Corporation, Charlotte, NC (US)

(72) Inventors: Lubomir A. Ribarov, West Hartford, CT (US); Leo J. Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 420 days.

(21) Appl. No.: 15/157,051

(22) Filed: May 17, 2016

(65) Prior Publication Data

US 2017/0335775 A1  Nov. 23, 2017

(51) Int. Cl.
| | |
|---|---|
| *F02C 9/18* | (2006.01) |
| *F02C 7/22* | (2006.01) |
| *F04D 27/00* | (2006.01) |
| *F16K 31/124* | (2006.01) |
| *F01D 17/14* | (2006.01) |

(Continued)

(52) U.S. Cl.
CPC ............. *F02C 9/18* (2013.01); *F01D 17/141* (2013.01); *F02C 6/08* (2013.01); *F02C 7/22* (2013.01); *F04D 27/009* (2013.01); *F04D 27/023* (2013.01); *F04D 27/0215* (2013.01); *F16K 31/124* (2013.01); *F16K 31/423* (2013.01); *F05D 2220/32* (2013.01);

(Continued)

(58) Field of Classification Search
CPC ........ F16K 31/124; F16K 31/423; F02C 6/08; F02C 7/22; F04D 27/023; F04D 27/0215; F04D 27/009; F05D 2260/57; F05D 2270/65; F05D 2260/406; F05D 2220/32; F05D 2270/64

See application file for complete search history.

(56) References Cited

U.S. PATENT DOCUMENTS 2,913,005 A * 11/1959 Grant .................. F15B 13/0431
                                                    137/625.6
3,022,450 A    2/1962 Chase (Continued)

FOREIGN PATENT DOCUMENTS

EP    2256390 A2    12/2010

OTHER PUBLICATIONS

The extended European search report received from the European Patent Office dated Oct. 2, 2017 for Application No. EP17171497.5.

*Primary Examiner* — Jason Newton
(74) *Attorney, Agent, or Firm* — Locke Lord LLP; Scott D. Wofsy; Christopher J. Cillié

(57) ABSTRACT

A solenoid for a bleed valve includes a solenoid body with an actuation fluid passage, a bleed valve passage, and a drive fluid chamber. A main armature is disposed within the solenoid body and is movable between open and closed positions, the actuation fluid passage being in fluid communication with the control outlet in the open position, the actuation fluid passage being fluidly isolated from the bleed valve passage in the second position. A pilot armature is disposed within the solenoid body, is movable relative to the main armature, and is operably coupled to the main armature by the drive fluid chamber to move the main armature between the open and closed positions by controlling issue of a drive fluid into and out of the drive fluid chamber.

17 Claims, 5 Drawing Sheets

(51) Int. Cl.
*F04D 27/02* (2006.01)
*F02C 6/08* (2006.01)
*F16K 31/42* (2006.01)

(52) U.S. Cl.
CPC .... *F05D 2260/406* (2013.01); *F05D 2260/57* (2013.01); *F05D 2270/64* (2013.01); *F05D 2270/65* (2013.01)

(56) References Cited

U.S. PATENT DOCUMENTS

| | | | | |
|---|---|---|---|---|
| 3,126,915 | A * | 3/1964 | Hunt | F16K 31/423 137/625.27 |
| 3,896,840 | A * | 7/1975 | Andersson | F16K 1/126 137/219 |
| 3,916,952 | A * | 11/1975 | Pauliukonis | F15B 11/064 137/625.64 |
| 4,305,566 | A * | 12/1981 | Grawunde | F16K 31/406 137/491 |
| 4,567,914 | A * | 2/1986 | Coppola | F15B 13/0405 137/625.27 |
| 4,576,200 | A * | 3/1986 | Janecke | G05D 16/2093 137/624.13 |
| 5,117,868 | A * | 6/1992 | Wagner | B64C 13/40 137/625.6 |
| 5,417,402 | A * | 5/1995 | Speybroeck | G05D 16/2093 251/30.01 |
| 5,645,263 | A * | 7/1997 | Aardema | F15B 13/0405 137/487.5 |
| 5,738,075 | A | 4/1998 | Chen et al. | |
| 5,833,146 | A | 11/1998 | Hefler | |
| 6,129,115 | A | 10/2000 | Janssen et al. | |
| 6,540,204 | B1 | 4/2003 | Carter | |
| 6,834,845 | B2 | 12/2004 | Finke et al. | |
| 6,997,432 | B2 | 2/2006 | Rapp | |
| 7,536,860 | B2 | 5/2009 | Safran et al. | |
| 8,258,904 | B2 | 9/2012 | Ben-Asher et al. | |
| 8,274,348 | B2 | 9/2012 | Kolb et al. | |
| 8,955,775 | B2 | 2/2015 | Jansen | |
| 2005/0044858 | A1 * | 3/2005 | Hooker | F02C 9/18 60/782 |
| 2008/0196773 | A1 * | 8/2008 | Franconi | F16K 31/124 137/492.5 |
| 2008/0197949 | A1 | 8/2008 | Lurquin et al. | |
| 2008/0251144 | A1 * | 10/2008 | Searle | F16K 31/1223 137/614.05 |
| 2010/0301238 | A1 * | 12/2010 | Krake | F16K 31/1245 251/25 |
| 2012/0045317 | A1 * | 2/2012 | Saladino | F02C 6/08 415/145 |
| 2016/0237913 | A1 * | 8/2016 | Marocchini | F01D 17/105 |
| 2016/0237915 | A1 * | 8/2016 | Villanueva | F02C 9/18 |
| 2016/0332355 | A1 * | 11/2016 | Rymann | B29C 49/12 |
| 2016/0376913 | A1 * | 12/2016 | Marocchini | F01D 17/145 137/511 |
| 2017/0016555 | A1 * | 1/2017 | Franconi | F16K 31/1225 |
| 2017/0298840 | A1 * | 10/2017 | Doody | F02C 7/222 |
| 2017/0335775 | A1 * | 11/2017 | Ribarov | F02C 7/22 |

\* cited by examiner

SOLENOIDS FOR GAS TURBINE ENGINE BLEED VALVES

BACKGROUND OF THE INVENTION

1. Field of the Invention

The present disclosure relates to valve actuators, and more particularly to fluid-assisted actuators for gas turbine engine bleed valves.

2. Description of Related Art

Gas turbine engines commonly include bleed valves coupled to the engine compressor section for removing working fluid from the engine core flow path. Start bleed valves, for example, allow compressed working fluid to exit the compressor section during start-up, reducing the mechanical power necessary to rotate the compressor rotor when the turbine section may otherwise be unable to fully power the compressor section. Stability bleed valves allow working fluid to exit the compressor section to prevent compressor stall and surge events, ensuring reliable engine operation. Other bleed valves provide heated working fluid to aircraft systems, such as de-icing and environmental control systems.

Bleed valves are generally operated by a solenoid valve that incorporates a movable internal armature and valve to operate the bleed valve. Arranged proximate the engine core, these armatures and valves typically experience vibration, and are therefore generally coupled as an assembly to hold during vibration. However, as engine operating ratios increase, actuator force requirements increase, and larger armatures become necessary to generating increased force. The larger armatures can unload the solenoid valve from seating and sealing due to vibration, and may, therefore, have a decoupled arrangement. While generally satisfactory for their intended purpose, such larger decoupled armatures may experience frictional wear related to engine vibration, reducing actuator reliability.

Such conventional methods and systems have generally been considered satisfactory for their intended purpose. However, there is still a need in the art for improved bleed valve actuators for gas turbine engines. The present disclosure provides a solution for this need.

SUMMARY OF THE INVENTION

A valve arrangement includes a first valve and a second valve. The first valve is controlled by movement of a solenoid armature of a solenoid. The second valve is controlled by movement of a main armature. The main armature is movable via porting of fluid controlled by the first valve, and the first valve has a smaller flow area that the second valve.

A solenoid for a bleed valve includes a solenoid body with an actuation fluid passage, a bleed valve passage, and a drive fluid chamber. A main armature is disposed within the solenoid body and is movable between open and closed positions, the actuation fluid passage being in fluid communication with the bleed valve passage in the open position, the actuation fluid passage being fluidly isolated from the bleed valve passage in the closed position. A pilot armature is disposed within the solenoid body, is movable relative to the main armature, and is operably coupled to the main armature by the drive fluid chamber to move the main armature between the open and closed positions by controlling issue of a drive fluid into and out of the drive fluid chamber.

In certain embodiments, the solenoid body can have vent passage. The vent passage can be in fluid communication with the bleed valve passage when the main armature is in the closed position. The main armature can include a ball closure element disposed on an end of the main armature opposite the drive fluid chamber. The main armature can include a piston disposed on an end of the main armature. The piston can be slideably received within the drive fluid chamber. A biasing element can be fixed between the main armature and the solenoid body. The biasing element can be configured and arranged to urge to the main armature toward the closed position.

In accordance with certain embodiments, a guide block can be disposed within the solenoid body. The main armature can be slideably received within the guide block. The guide block can include an overboard drain separated from the drive fluid chamber by a gasket. The gasket can be a first gasket, and a second gasket can separate the overboard drain from the actuation fluid passage. The solenoid can include a charging conduit connectable to the drive fluid chamber by the pilot armature. The charging conduit can be in fluid communication with the actuation fluid passage. The charging conduit can be in fluid communication with a pressurized fuel source for a gas turbine engine. A drive chamber discharge conduit can be in fluid communication with the drive fluid chamber. The discharge conduit can be in selective fluid communication with environment external to the solenoid through the vent. The discharge conduit can be in selective fluid communication with a gas turbine engine fuel system.

It is also contemplated that, in accordance with certain embodiments, the pilot armature can include a ball closure. The ball closure of the pilot armature can be smaller than the ball closure of the main armature. A coil can be fixed relative to the solenoid body and operatively coupled to the pilot armature. The ball closure of the pilot closure can be movable between first and second positions. The drive fluid chamber can be in fluid communication with a discharge conduit when the ball closure is in the first position. The drive fluid chamber of the pilot solenoid can be in fluid communication with the charging conduit when the ball closure is in the second position. Movement of the pilot solenoid between the first and second positions can cause the main armature to move between the open and closed positions. A biasing element can be connected between the solenoid body and the pilot armature. The biasing element can be configured and arranged to urge the pilot armature toward the first position.

A bleed valve arrangement for a gas turbine engine includes a bleed valve with an actuation fluid inlet and a solenoid as described above. The bleed valve passage of the solenoid is in fluid communication with the actuation fluid inlet to fluidly couple the gas turbine engine core flow path with the external environment using the pilot armature of the solenoid.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
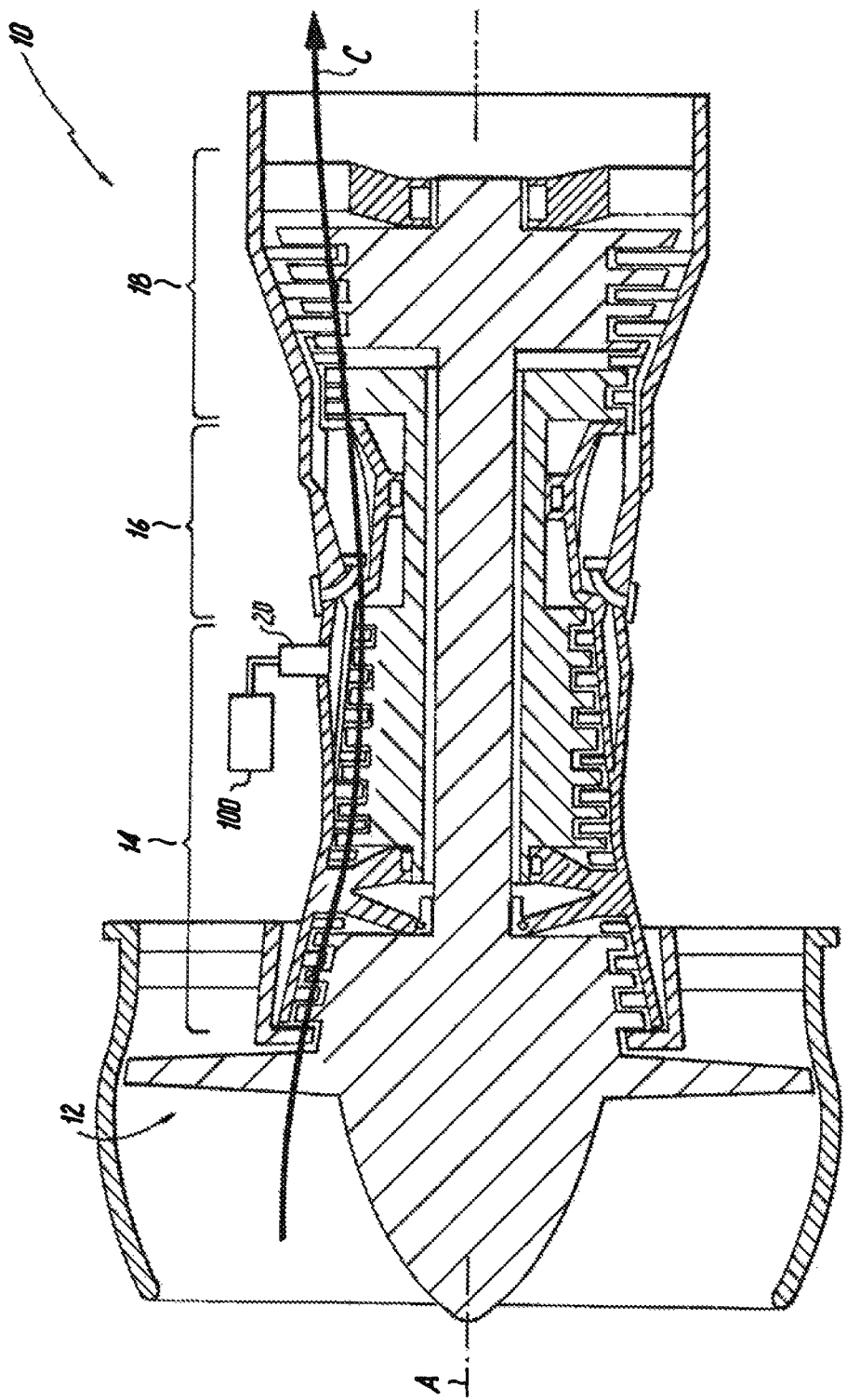
FIG. 1 is a cross-sectional view of an exemplary embodiment of a gas turbine engine constructed in accordance with the present disclosure, schematically showing a solenoid operably connected to a bleed valve in an exemplary gas turbine bleed valve arrangement.

Reference will now be made to the drawings wherein like reference numerals identify similar structural features or aspects of the subject disclosure. For purposes of explanation and illustration, and not limitation, a partial view of an exemplary embodiment of a fluid-assisted solenoid in accordance with the disclosure is shown in FIG. 1 and is designated generally by reference character 100. Other embodiments of solenoids and bleed valve arrangements incorporating such solenoids, or aspects thereof, are provided in FIGS. 2-4, as will be described. The systems and methods described herein can be used for bleeding air from gas turbine engines, such as for venting gas turbine engine compressor sections during engine start-up, preventing compressor stall and surge events during operation, and/or for providing bleed air for aircraft auxiliary systems.

Referring to FIG. 1, a gas turbine engine 10 is shown. Gas turbine engine 10 generally includes a fan section 12, a compressor section 14, a combustion section 16, and a turbine section 18 arranged along a rotation axis A. A bleed valve 20 is connected to compressor section 14 and is selectively in fluid communication compressor gas path C contained therein, as will be detailed below. A solenoid 100 is operably connected to bleed valve 20. FIG. 1 is a highly schematic view, however, it does show the main sections of the gas turbine engine. Further, while a particular type of gas turbine engine is illustrated, it should be understood that other types of gas turbine engines will also benefit from the present disclosure.

Figure 2:
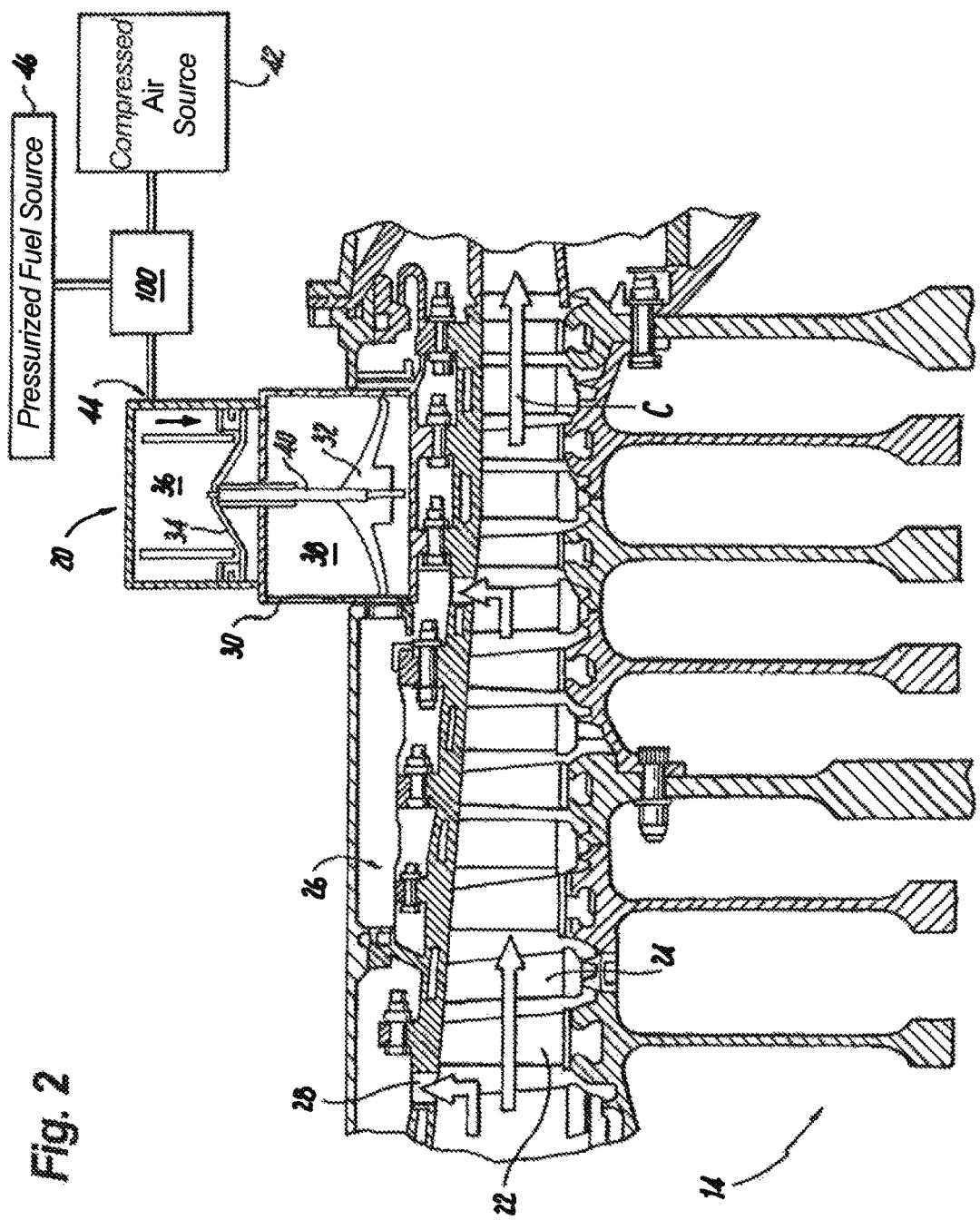
FIG. 2 is a cross-sectional view of the compressor section of the bleed valve arrangement of FIG. 1, schematically showing the bleed valve arrangement.

With reference to FIG. 2, compressor section 14 is shown. Compressor section 14 includes a plurality of rotating compressor blades 22 and fixed vanes 24 arranged along compressor gas path C. An airflow, known as a core airflow (indicated with arrows), is communicated along the compressor gas path C into the downstream combustor section 16 (shown in FIG. 1). An air plenum 26 is typically positioned outwardly of the compressor gas path C such that compressed air flows through openings 28 from the compressor gas path C and into the air plenum 26 for use in, for example, a bleed flow system.

Figure 3A:
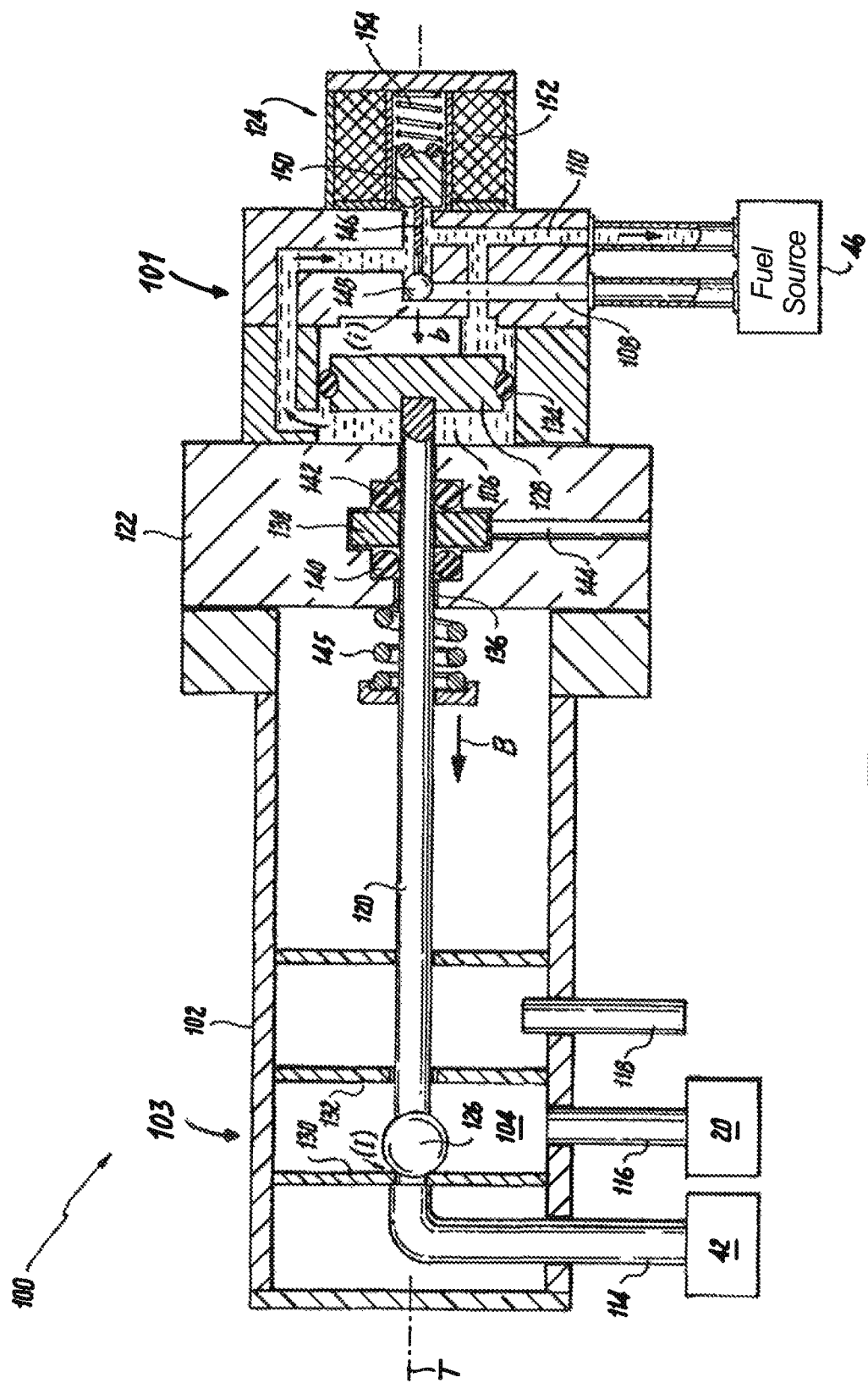
FIGS. 3A and 3B are schematic views of the solenoid of FIG. 1, schematically showing the solenoid fluidly separating and fluidly coupling the bleed valve to a source of bleed valve actuation fluid using pressurized drive fluid supplied by the gas turbine engine fuel system.

A valve arrangement, e.g., fluid-assisted solenoid 100, includes a first valve 101 (shown in FIG. 3A) and a second valve 103 (shown in FIG. 3A). First valve 101 is controlled by movement of a solenoid armature, e.g., solenoid armature 146 (shown in FIG. 3A), of a solenoid, e.g., pilot solenoid 124 (shown in FIG. 3A). Second valve 103 is controlled by movement of a main armature, e.g., main armature 120 (shown in FIG. 3A). Main armature 120 is movable via porting of fluid, e.g., pressurized fuel (shown in FIG. 3A) or compressed air (shown in FIG. 4) controlled by first valve 101. First valve 101 has a smaller flow area than second valve 103, illustrated schematically in an exemplary way by the relative sizes of a charging conduit 108 (shown in FIG. 3A) and an actuation fluid conduit 114 (shown in FIG. 3A).

Bleed valve 20 includes a valve body 30 with a closure 32 connected to a piston 34. Valve body 30 defines within its interior an actuation chamber 36 and a venting chamber 38. Closure 32 is movably disposed within venting chamber 38 and is coupled to piston 34 by a shaft 40, which sealably extends between actuation chamber 36 and venting chamber 38. Actuation chamber 36 is in selective fluid communication with a pressurized fluid source 42, e.g., compressed air and another pressurized fluid source 46, e.g., pressurized fuel, through solenoid 100 and an actuation fluid inlet 44, and upon receipt of fluid therefrom, displaces closure 32 downwards (relative to the drawing sheet). Downward displacement of closure 32 places air plenum 26 in fluid communication with the external environment, core flow path C thereby being in fluid communication with the external environment through bleed valve 20. Pressurized fluid source 42 can include compressed bleed air from a higher stage of compressor section 14.

Figure 3B:
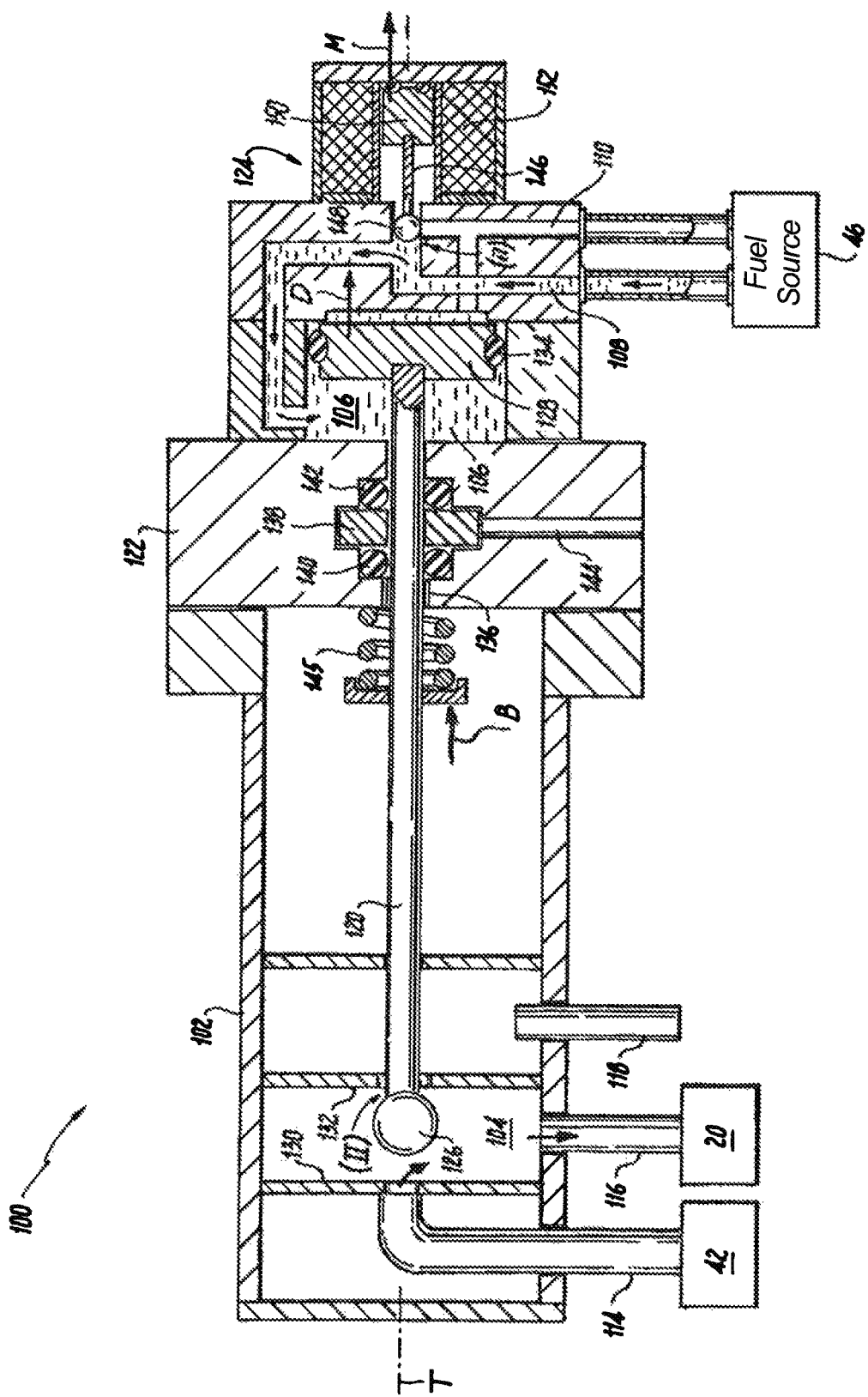

With reference to FIGS. 3A and 3B, solenoid 100 is shown. Solenoid 100 includes a solenoid body 102 defining a translation axis T and having an actuation fluid chamber 104 and a drive fluid chamber 106. Charging conduit 108 and a discharge conduit 110 are connected to drive fluid chamber 106. Charging conduit 108 is in fluid communication with a source of pressurized fluid, which in the illustrated exemplary embodiment is fuel system 46, to provide pressurized fluid to drive fluid chamber 106. Drive fluid discharge conduit 110 is also in fluid communication with the pressurized fluid source for discharging fluid from drive fluid chamber 106, e.g., by returning fuel to fuel system 46.

Actuation fluid passage 114, bleed valve passage 116, and vent passage 118 are each connected to actuation fluid chamber 104. Actuation fluid passage 114 is in fluid communication with a source of actuation fluid, which can be core airflow C (shown in FIG. 2) from a higher pressure stage of compressor section 14, i.e. downstream of bleed valve 20. Bleed valve passage 116 is in fluid communication with bleed valve 20 (shown in FIG. 2), and connects actuation chamber 36 of bleed valve 20 with actuation fluid chamber 104. Vent passage 118 is in fluid communication with the environment external to solenoid 100.

Solenoid 100 also includes a main armature 120, a guide block 122, and a pilot solenoid 124. Main armature 120 is disposed along translation axis T on a side of guide block 122 opposite pilot solenoid 124 and includes a main closure element 126 and a piston 128. Main closure element 126, which in the illustrated exemplary embodiment is a ball closure element, is fixed to main armature 120 and is disposed within actuation fluid chamber 104 between a supply seat 130 and a vent seat 132. Piston 128 is fixed to main armature 120 on an end opposite main closure element 126, and is slidably and sealably disposed within drive fluid chamber 106. An optional seal 134 extends about piston 128 between piston 128 and walls of drive fluid chamber 106, limiting (or eliminating) fluid communication axially within drive fluid chamber 106 between axially opposed ends of drive fluid chamber 106.

Guide block 122 has an aperture 136 extending about translation axis T. A bushing 138, gasket 140, and gasket 142 are disposed within guide block 122 and extend about translation axis T. Main armature 120 is slideably received within guide block 122 within aperture 136 by bushing 138. An overboard drain 144 is in fluid communication with bushing 138 for discharging fluid infiltrating guide block 122, e.g., from actuation fluid chamber 104 and/or drive fluid chamber 106. Gasket 140 is arranged axially between bushing 138 and actuation fluid chamber 104 to limit (or prevent) infiltration of fluid from actuation fluid chamber 104 bushing 138; gasket 142 is arranged axially between bushing 138 and actuation fluid chamber 104 to limit (or prevent) infiltration of fluid from actuation fluid chamber 104 bushing 138. A biasing element 145, which in the illustrated exemplary embodiment is a spring, is arranged within solenoid body 102 between main armature 120 and guide block 122, and is configured to urge main armature toward a predetermined position with a biasing force B.

Pilot solenoid 124 includes a pilot armature 146 with a pilot closure element 148 and a ferromagnetic body 150. Ferromagnetic body 150 is disposed on an end of pilot armature 146 opposite pilot closure element 148. Pilot armature 146 is mechanically separated from main armature 120 and is operably connected thereto by drive fluid chamber 106. In the illustrated exemplary embodiment, pilot closure element 148 is a ball closure element with a surface area that is smaller than a surface area of main closure element 126, and is arranged axially along translation axis T. A pilot armature biasing element 154, illustrated in the exemplary embodiment as a spring, is connected between pilot armature 146 and solenoid body 102. Pilot armature biasing element 154 is arranged to exert a pilot biasing force b (shown in FIG. 3A) on pilot armature 146. A coil 152 is fixed relative to solenoid body 102 and is configured to apply electromotive force M (shown in FIG. 3B) to pilot armature 146.

Pilot armature biasing force b urges pilot armature 146 toward a first position (i), shown in FIG. 3A. In first position (i) pilot closure element 148 fluidly separates charging conduit 108 from drive fluid chamber 106, and places drive fluid chamber 106 in fluid communication with drive fluid discharge conduit 110. When drive fluid chamber 106 is in fluid communication with drive fluid discharge conduit 110, biasing force B drives main armature 120 to first position I, shown in FIG. 3A, wherein main closure element 126 seats against supply seat 130. This separates actuation fluid source 42 from bleed valve 20, causing bleed valve 20 to close.

Upon application of current to coil 152, coil 152 applies an electromotive force M to pilot armature 146. Coil 152 is sized such that electromotive force M overcomes biasing force b, thereby causing pilot armature 146 to translate away from piston 128. Translation of pilot armature 146 away from piston 128 moves pilot closure element 148 from first position (i) (shown in FIG. 3A) to a second position (ii) (shown in FIG. 3B) wherein pilot closure element 148 fluidly separates drive fluid chamber 106 from drive fluid discharge conduit 110, and wherein charging conduit 108 is in fluid communication with drive fluid chamber 106. Fluid communication of charging conduit 108 with drive fluid chamber 106 allows pressurized fluid to issue into drive fluid chamber 106 from the pressurized fluid source, e.g., fuel system 46, and exerts a drive force D (shown in FIG. 3B) on piston 128. Drive force D is sized to overcome the biasing force B, thereby causing main armature 120 to translate along translation axis T and move main closure element 126 to an open position (II) (shown in FIG. 3B). In second position II, actuation fluid flows from actuation fluid source 42 to bleed valve passage 116, causing bleed valve 20 (shown in FIG. 2) to open and vent compressor section 14 (shown in FIG. 2) to the environment external to gas turbine engine 10.

Figure 4:
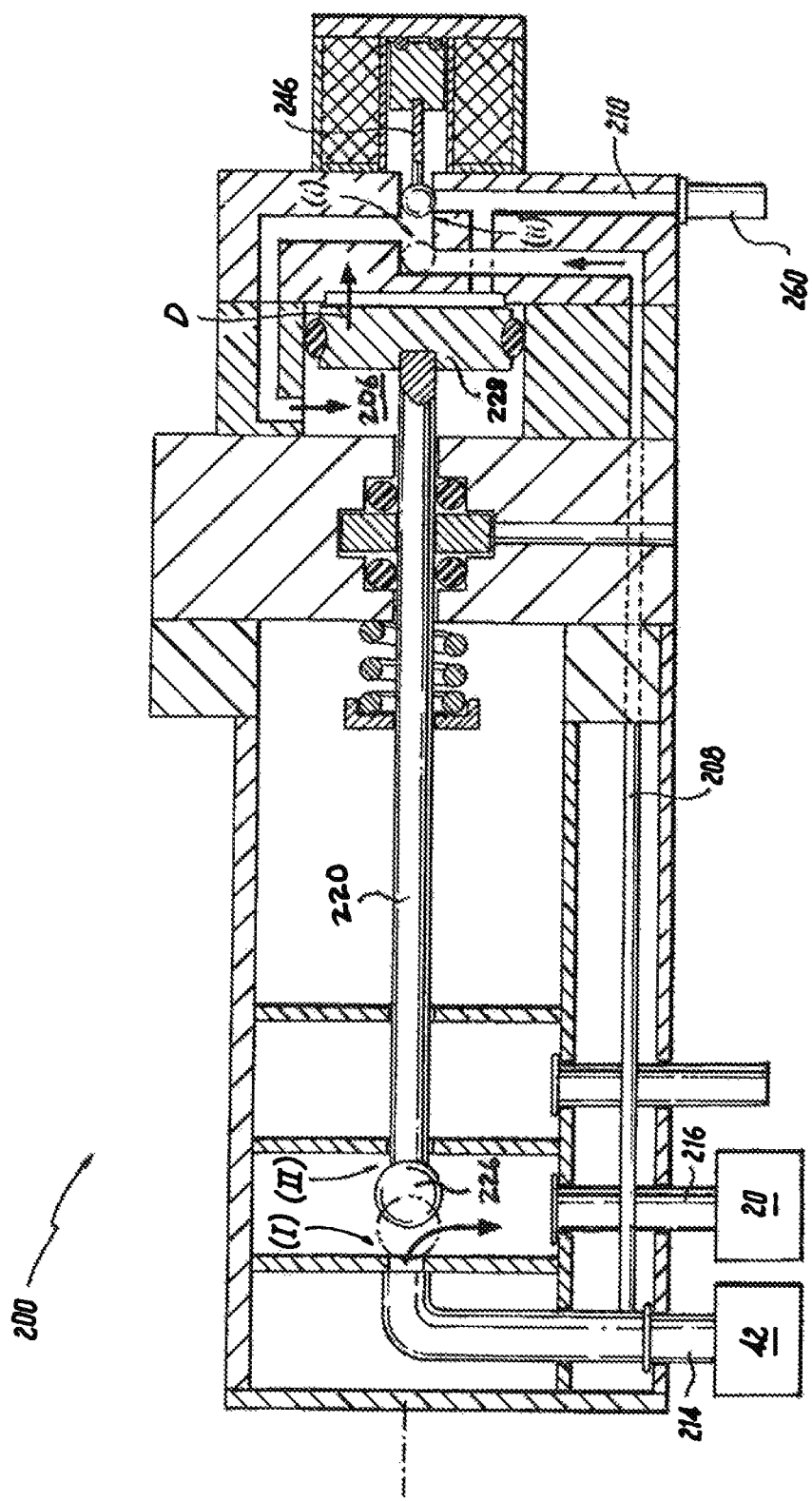
FIG. 4 is a schematic view of another embodiment of a solenoid arrangement, schematically showing a solenoid fluidly separating and fluidly coupling the bleed valve to a source of bleed valve actuation fluid using pressurized drive fluid supplied by the gas turbine compressor.

With reference to FIG. 4, a solenoid 200 is shown. Solenoid 200 is similar to solenoid 100, and is additionally arranged and configured to move a main closure element 226 between closed position I (shown in dashed outline) and open position II (shown in solid outline) using compressed air. In this respect when pilot armature 246 is in second position (ii), a charging conduit 208 connected to actuation fluid passage 214 issues compressed air into drive fluid chamber 206. The compressed air exerts drive force D on piston 228, causing main armature 220 to displace between closed position I and open position II, causing fluid to flow from actuation fluid source 42 through bleed valve passage 216, which opens bleed valve 20 as described above. When pilot armature 246 moves to first position (i) charging conduit is fluidly separated from drive fluid chamber 206. Drive fluid chamber 206 becomes fluidly communicative with discharge conduit 210, and fluid issues from drive chamber 206 through a vent 260 to the environment external to solenoid 200.

In embodiments of solenoids, e.g., solenoid 100 and/or solenoid 200, and bleed valve arrangements having such solenoids described herein, a relatively small pilot armature is operably coupled to a main armature. The pilot armature has relatively small magnetics and may be relatively light, and therefore does not require decoupling to hold during vibration. This reduces wear of internal valve and solenoid components that can otherwise be associated with vibration, potentially improving reliability of the solenoid and bleed valve arrangements employing such solenoids.

The methods and systems of the present disclosure, as described above and shown in the drawings, provide for bleed valves with superior properties including one or more reduced friction/vibration-associated wear, tolerance for high temperature and/or high pressure environments, and improved durability operability. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A solenoid for a bleed valve arrangement, comprising:
a solenoid body with an actuation fluid passage, a bleed valve passage, and a drive fluid chamber;
a main armature disposed within the solenoid body and movable between an open position and a closed position, the actuation fluid passage being in fluid communication with the bleed valve passage in the open position, the actuation fluid passage being fluidly isolated from the bleed valve passage in the closed position;
a pilot armature disposed within the solenoid body and movable relative to the main armature, wherein the pilot armature is operably coupled to the main armature by the drive fluid chamber to move the main armature between the open position and the closed position by controlling issue of a drive fluid into and out of the drive fluid chamber; and a guide block disposed within the solenoid body, the main armature being slidably received within the guide block, the guide block comprising an overboard drain separated from the drive fluid chamber by a gasket.

2. The solenoid as recited in claim 1, wherein the main armature comprises a ball closure element disposed on an end of the main armature opposite the drive fluid chamber.

3. The solenoid as recited in claim 1, wherein the main armature comprises a piston disposed on an end of the main armature, the piston being slidably received within the drive fluid chamber.

4. The solenoid as recited in claim 1, further including a biasing element fixed between the main armature and the solenoid body, the biasing element being configured to urge to the main armature toward the closed position.

5. The solenoid as recited in claim 1, wherein the gasket is a first gasket, and further comprising a second gasket separating the overboard drain from the actuation fluid passage.

6. The solenoid as recited in claim 1, wherein the solenoid body comprises a vent passage that is in fluid communication with the bleed valve passage when the main armature is in the closed position.

7. The solenoid as recited in claim 1, further comprising a charging conduit connectable to the drive fluid chamber by the pilot armature.

8. The solenoid as recited in claim 7, wherein the charging conduit is in fluid communication with the actuation fluid passage.

9. The solenoid as recited in claim 7, wherein the charging conduit is in fluid communication with a pressurized fuel source.

10. The solenoid as recited in claim 1, wherein the solenoid comprises a discharge conduit in fluid communication with the drive fluid chamber.

11. The solenoid as recited in claim 10, wherein the discharge conduit is in selective fluid communication with environment external to the solenoid through a vent.

12. The solenoid as recited in claim 10, wherein the discharge conduit is in selective fluid communication with a gas turbine engine fuel system.

13. The solenoid as recited in claim 1, wherein the pilot armature comprises a ball closure element movable between a first position and a second position, the drive fluid chamber being in fluid communication with a discharge conduit in the first position, the drive fluid chamber being in fluid communication with the actuation fluid passage in the second position.

14. The solenoid as recited in claim 13, further comprising a biasing element connected between the solenoid body and the pilot armature, the biasing element configured to urge the pilot armature toward the first position.

15. The solenoid as recited in claim 1, wherein the solenoid comprises a coil fixed relative to the solenoid body and operatively coupled to the pilot armature.

16. A bleed valve arrangement for a gas turbine engine, comprising:
a bleed valve with an actuation fluid inlet, the bleed valve configured to fluidly couple a gas turbine engine core flow path with the external environment when actuated; and
the solenoid as recited in claim 1, wherein the bleed valve passage of the solenoid is in fluid communication with the actuation fluid inlet of the bleed valve to fluidly couple the gas turbine engine core flow path with the external environment using the pilot armature of the solenoid.

17. The bleed valve arrangement as recited in claim 16, wherein the solenoid includes a charging conduit connectable to the drive fluid chamber by the pilot armature, (a) wherein the charging conduit is in fluid communication with the actuation fluid passage of the solenoid body, wherein the solenoid includes a discharge conduit in fluid communication with the drive fluid chamber, and wherein the discharge conduit is in fluid communication with environment external to the solenoid through a vent, or (b) wherein the charging conduit is in fluid communication with a pressurized fuel source, wherein the solenoid includes a discharge conduit in fluid communication with the drive fluid chamber, and wherein the discharge conduit is in fluid communication with a gas turbine engine fuel system.

\* \* \* \* \*